Sept. 16, 1958 W. E. SAXE 2,852,188
INTEGRATOR FOR CONVEYOR SCALE
Filed Sept. 16, 1954 3 Sheets-Sheet 1

INVENTOR.
WALTER E. SAXE
BY HIS ATTORNEYS.
HARRIS, KIECH, FOSTER & HARRIS

Sept. 16, 1958  W. E. SAXE  2,852,188
INTEGRATOR FOR CONVEYOR SCALE
Filed Sept. 16, 1954  3 Sheets-Sheet 2

INVENTOR.
WALTER E. SAXE
BY HIS ATTORNEYS.
HARRIS, KIECH, FOSTER & HARRIS

INVENTOR.
WALTER E. SAXE
BY HIS ATTORNEYS.
HARRIS, KIECH, FOSTER & HARRIS

United States Patent Office 2,852,188
Patented Sept. 16, 1958

2,852,188
INTEGRATOR FOR CONVEYOR SCALE

Walter E. Saxe, Pasadena, Calif., assignor to The Conveyor Company, Los Angeles, Calif., a corporation of California Application September 16, 1954, Serial No. 456,529

18 Claims. (Cl. 235—61)

The present invention relates in general to an apparatus for integrating a variable and, more particularly, to an apparatus wherein any variation in the variable is manifested by movement of a primary member along a predetermined path through a distance which is a function of such variation in the variable so that the distance of the primary member from a reference station on the path is always a function of the magnitude of the variable. As a matter of convenience, the invention will be considered herein in connection with a conveyor scale wherein the variable to be integrated is the weight of material being transported over the conveyor scale by a conveyor, the primary member being movable along its path through distances which are a function of any variations in the weight of material on the conveyor scale so that the distance of the primary member from the reference station on its path is always a function of the weight of the material on the conveyor scale. However, it will be understood that the invention is susceptible of other applications, the particular application of the invention to a conveyor scale considered herein being illustrative only.

A primary object of the invention is to provide an integrating apparatus which includes an integrating means and which includes means for periodically energizing the integrating means throughout a portion of a predetermined time interval corresponding to that portion of the path of the primary member through which the primary member has been displaced from the reference station. For example, if the position of the primary member during a particular time interval corresponds to a displacement along its path from the reference station of 50%, the integrating means is energized for 50% of such time interval, the time interval being sufficiently short that no consequential movement of the primary member occurs thereduring, and the frequency of energization of the integrating means being sufficiently high to obtain an accurate integration of the variable.

In effect, the integrating apparatus of the invention operates on a scanning principle, an object being to provide means for periodically scanning the path of the primary member to locate it, and for energizing the integrating means during that portion of each scanning interval which corresponds to the displacement of the primary member from the reference station.

More particularly, an object of the invention is to provide a secondary member which is also movable and which has means associated therewith for energizing the integrating means when the secondary member is in a first position corresponding to the reference station on the path of the primary member, and for de-energizing the integrating means when the secondary member is in a second position corresponding to the actual position of the primary member on its path. In other words, the second position of the secondary member is spaced from the first position thereof a distance which is a function of the distance of the primary member from the reference station on its path so that, after the integrating means is energized, it remains energized until the secondary member has traversed a distance which is a function of the actual magnitude of the variable, whereupon the integrating means is de-energized.

Another object is to provide an apparatus of the foregoing general character wherein the means for de-energizing the integrating means includes photoelectric means, or photoelectric switching means, and wherein the primary member includes light-conveying means for conveying light to the photoelectric means to operate same, the means for de-energizing the integrating means also including a light source carried by the secondary member and adapted to register with the light-conveying means of the primary member after the secondary member has been moved through a distance, from its first position which is a function of the magnitude of the variable, i. e., which is a function of the distance of the primary member from the reference station on its path.

Another object is to provide an integrating apparatus of the foregoing nature wherein the primary and secondary members, hereinafter also referred to as primary and secondary rotors, are rotatable about a common axis, the primary rotor being rotatable through a complete revolution from its reference station, and the secondary rotor being rotatable through a plurality of revolutions.

Another object of the invention is to provide an integrating means which is driven by an actuating means, and to provide clutch means for coupling the integrating means to and uncoupling the integrating means from the actuating means so as to energize and de-energize the integrating means.

Another object is to provide a clutch means which includes a clutch member engageable either with the actuating means to couple the integrating means to the actuating means, or with a braking means to insure immediate termination of the operation of the integrating means upon disengagement of the clutch means.

Another object is to provide an actuating means which includes a driving member having magnetic means thereon and to provide a braking means which includes a braking member having magnetic means thereon, the magnetic means on the driving member and the braking member being selectively energizable to cause the clutch member, which is magnetic, to either engage the driving member to couple the integrating means to the actuating means, or to engage the braking member upon uncoupling of the integrating means from the actuating means to insure immediate termination of the operation of the integrating means. It will be understood that the clutch means couples the integrating means to the actuating means when the secondary member or rotor is in a position corresponding to the reference station on the path of the primary member or rotor, and uncouples the integrating means from the actuating means when the secondary member or rotor is in a position corresponding to the actual position of the primary member or rotor on its path. Thus, the integrating means is in operation during that portion of each revolution of the secondary rotor corresponding to that portion of a revolution which the primary rotor is spaced from its reference position.

The foregoing objects, advantages and features of the present invention, together with various other objects, advantages and features thereof which will become apparent, may be attained with the exemplary embodiment of the invention illustrated in the accompanying drawings and described in detail hereinafter. Referring to the drawings.

Figure 1:
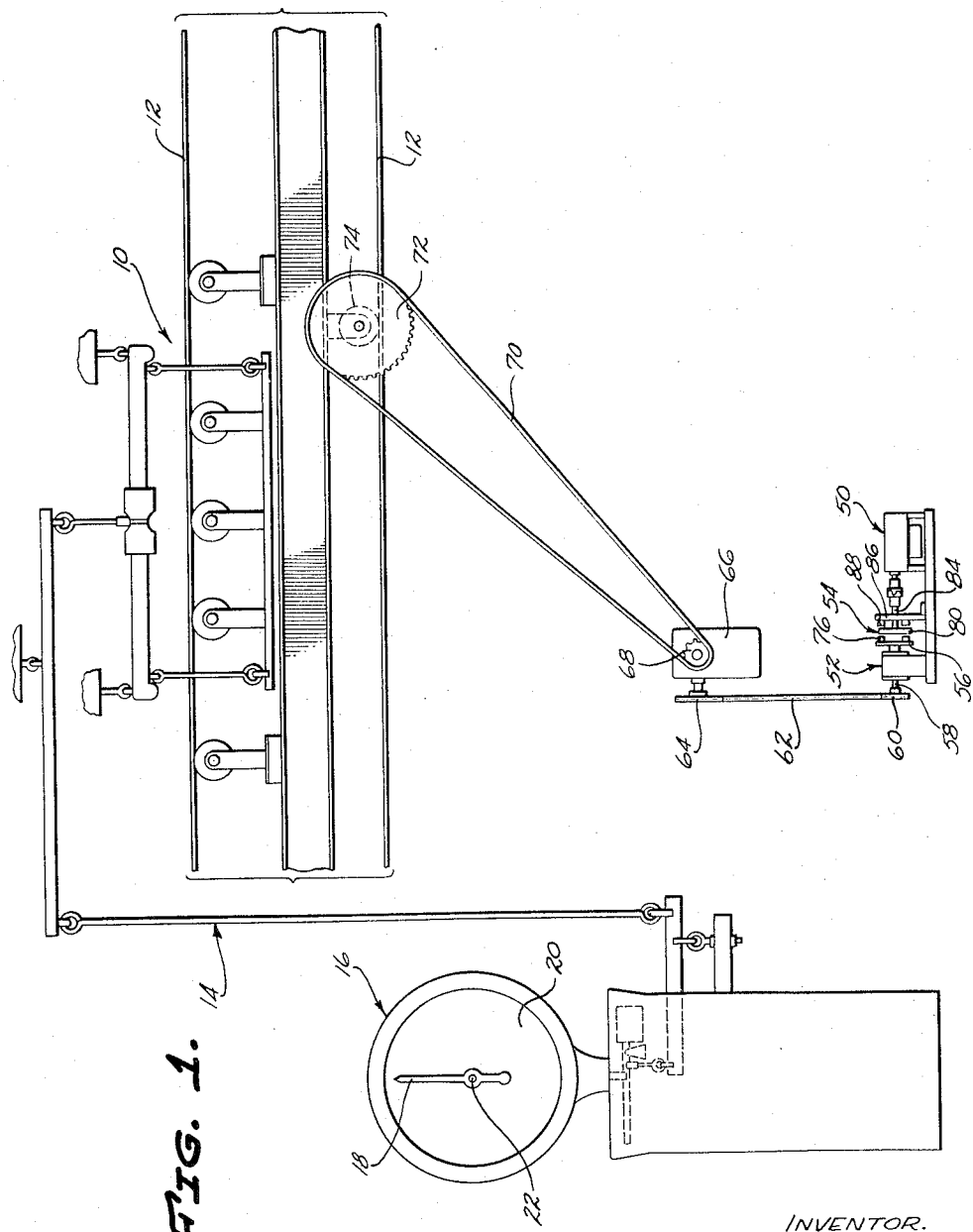
Fig. 1 is a diagrammatic view illustrating the intergrating apparatus of the invention incorporated in an apparatus for integrating the weight of material transported over a conveyor scale by a conveyor.

Referring particularly to Fig. 1 of the drawings, illustrated therein is a conveyor scale 10 traversed by the upper run of a conveyor 12, the conveyor scale 10 supporting a portion of the upper run of the conveyor. The conveyor scale 10 is connected, by any suitable intervening linkage 14, to a scale head 16 to produce movement of a pointer 18 over a dial 20, the pointer 18 being mounted on a shaft 22. The elements thus far described are conventional and a detailed description of this structure and the operation thereof is thought to be unnecessary, it being apparent that the pointer 18 moves over the dial 20 in response to variations in the weight of material conveyed by the upper run of the conveyor 12.

Figure 3:
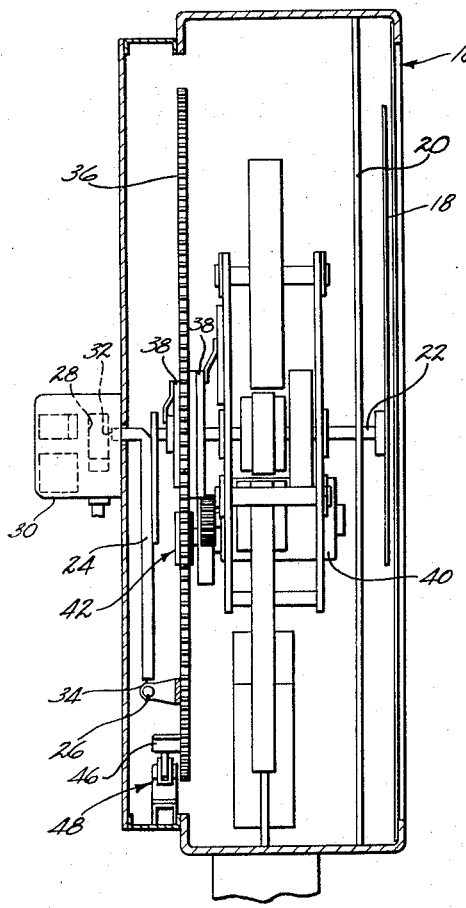
Fig. 3 is an enlarged sectional view taken along the arrowed line 3—3 of Fig. 2.
Figure 2:
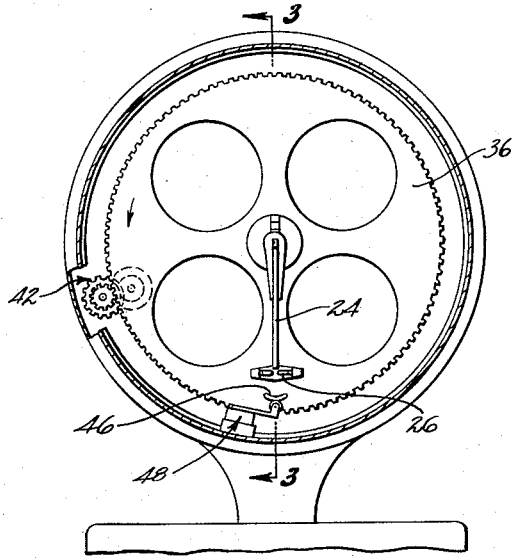
Fig. 2 is a sectional view of a weight scale head incorporating elements of the integrating apparatus of the invention.
Figure 5:
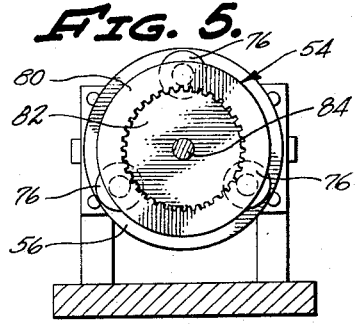
Fig. 5 is a sectional view taken along the arrowed line 5—5 of Fig. 4.

Referring now to Figs. 2 and 3 of the drawings, mounted on the pointer shaft 22 is a primary member or rotor 24 which serves as a light-conveying means for conveying light from a light source 26 to a photoelectric cell, or photocell, 28, the latter being associated with a photoelectric relay, or photoelectric switching means, 30 mounted on the rear of the scale head 16. In the particular construction illustrated, the primary rotor 24 is formed of a material capable of transmitting light along an irregular path, an example of such a material being methyl methacrylate, commonly known by the trade name "Lucite." The primary rotor 24 has an inner end 32 registering with the photocell 28 and an outer end 34 with which the light source 26 is adapted to register. Thus, when the light source 26 registers with the outer end 34 of the primary rotor 24, the latter conveys light to the photocell to actuate the photoelectric relay 30 for a purpose to be described.

The light source 26 is carried by a secondary member 36, the secondary member being a rotor, specifically shown as a gear, mounted for rotation about the axis of the pointer shaft 22, the primary and secondary rotors 24 and 36 thus rotating about a common axis. The secondary rotor 36 may be mounted for rotation about the axis of the pointer shaft 22 in any suitable manner, not specifically shown. Current for energizing the light source 26 carried by the secondary rotor 36 is supplied through slip rings 38. The secondary rotor 36 is rotated continuously, when the apparatus of the invention is in operation, by an electric motor 40 through suitable gearing 42.

As best shown in Fig. 2 of the drawings, the secondary rotor 36 carries a cam 46 which is adapted to operate a switch means 48 when the secondary rotor is in a first position corresponding to a reference station on the path of the primary rotor 24. Specifically, the cam 46 and switch means 48 will normally be so located that the cam operates the switch means when the secondary rotor 36 is in a first position such that the pointer 18 is at zero on the dial 20. In the particular construction illustrated, the primary rotor 24 is aligned with the switch means 48 when the pointer 18 is at zero on the dial 20, as best shown in Fig. 2. As will be discussed in more detail hereinafter, when the switch means 48 is operated by the cam 46, an integrating means 50, Figs. 1 and 4, is energized and remains energized until such time as the light source 26 on the secondary rotor 36 registers with the outer end 34 of the primary rotor 24 to convey light to the photocell 28, whereupon the integrating means 50 is de-energized, it being understood that the distance the primary rotor 24 is located from the reference station on its path is a function of, usually proportional to, the weight of material on the upper run of the conveyor 12.

Figure 4:
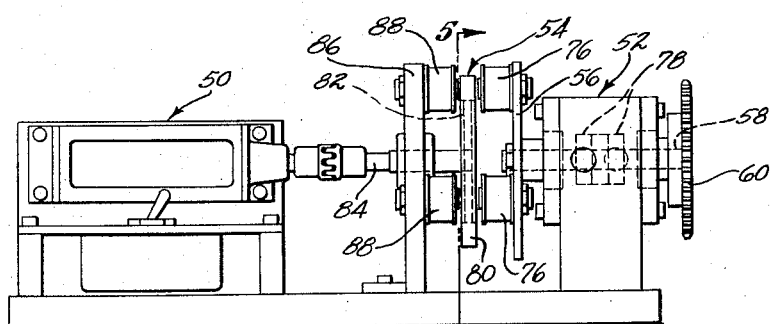
Fig. 4 is an enlarged elevational view of a portion of the integrating apparatus of the invention.

Considering Figs. 1 and 4 of the drawings, the integrating means 50 is shown as including a counter which is adapted to be driven by an actuating means 52 through a clutch means 54, the clutch means being adapted to couple the integrating means 50 to the actuating means, or to uncouple it therefrom. The actuating means 52 includes a driving member 56 which is mounted on a shaft 58 driven by a sprocket 60, the latter being driven by a chain 62 trained around the sprocket 60 and an output sprocket 64 of a gear box 66. An input sprocket 68 of the gear box 66 has trained therearound a chain 70 which is also trained around a sprocket 72 driven by the conveyor 12, the sprocket 72 being shown as driven by a roller 74 in engagement with the lower run of the conveyor 12. By driving the actuating means 52 for the integrating means 50 from the conveyor 12 in this manner, variations in conveyor speed are taken into consideration by the integrating means 50, as will be apparent.

The driving member 56 of the actuating means 52 carries one or more electromagnets 76 supplied with current through slip rings 78, the manner in which the circuit containing the electromagnets 76 is closed being considered hereinafter. When the electromagnets 76 are energized, they pull a clutch member 80 of the clutch means 54 into engagement with the driving member 56, the clutch member 80 being made of a magnetizable material. The clutch member 80 is provided with internal splines engaging external splines on a driven member or disc 82 which is mounted on a shaft 84 connected to the integrating means 50. Thus, when the electromagnets 76 are energized, the clutch means 54 couples the integrating means 50 to the actuating means 52, the latter being driven by the conveyor 12 in the manner hereinbefore described.

On the opposite side of the clutch member 80 from the driving member 56 is a braking member 86 carrying one or more electromagnets 88, the braking member 86 being stationary. As will be apparent, when the electromagnets 76 are de-energized and the electromagnets 88 are energized, the clutch member 80 is drawn into engagement with the braking member 86 to immediately interrupt operation of the integrating means 50, thereby preventing any coasting thereof, which is an important feature of the invention.

Figure 6:
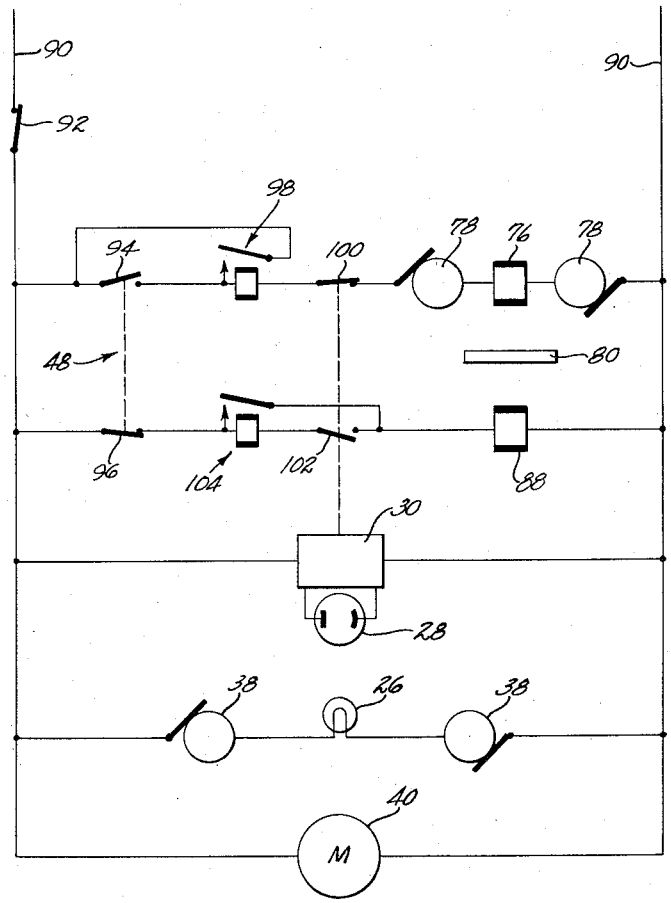
Fig. 6 is a simplified diagrammatic view of an electrical circuit incorporated in the integrating apparatus of the invention.

Referring to Fig. 6 of the drawings, which is merely a highly simplified schematic diagram illustrative of a possible electrical circuit for the integrating apparatus of the invention, the photoelectric relay 30, the light source 26 and the motor 40 are shown as connected in parallel across main leads 90 one of which is provided therein with a main switch 92. The electromagnets 76 and 88 are also connected in parallel across the main leads 90, only one each of the electromagnets 76 and 88 being shown in Fig. 6 of the drawings. The electromagnets 76 and 88 are respectively connected in series with normally open and normally closed switches 94 and 96 forming the switch means 48, a holding relay 98 being shown as connected in series with the electromagnet 76 and across the switch 94. The photoelectric relay 30 is diagrammatically shown as controlling normally closed and normally open switches 100 and 102 respectively connected in series with the electromagnets 76 and 88, a holding relay 104 being shown as connected in series with the electromagnet 88 and across the switch 102.

Considering the operation of the integrating apparatus of the invention, it will be assumed that the weight of material being transported by the conveyor 12 is such as to cause the pointer 18 to be displaced over the dial 20 one-half of a complete revolution. Consequently, under such conditions, the primary rotor 24 is also displaced along its path one-half of a revolution from the reference station on its path, assuming a direct-proportion relation.

Under the foregoing conditions, it will be assumed that the secondary rotor 36 is approaching a position such that the cam 46 thereon is about to engage the switch means 48, this position of the secondary rotor being referred to herein as its first position and corresponding to the reference station of the primary rotor 24, i. e., the zero position of the scale pointer 18. When the cam 46 engages the switch means 48, it momentarily opens the normally closed switch 96 to deenergize the braking electromagnets 88 on the braking member 86, the holding relay 104 also being de-energized. At the same time, the normally open switch 94 is momentarily closed to energize the holding relay 98 and the driving electromagnets 76 associated with the driving member 56, the normally closed and normally open switches 100 and 102 being closed and open, respectively, under these conditions. Consequently, the clutch member 80 is shifted into engagement with the driving member 56 to couple the integrating means 50 to the actuating means 52, the holding relay 98 causing the integrating means 50 to remain coupled to the actuating means 52 despite only momentary closure of the switch 94.

The foregoing conditions obtain until such time as the secondary rotor 36 completes one-half of a revolution under the particular exemplary set of conditions hereinbefore discussed. At the end of one-half of a revolution of the secondary rotor 36, the light source 26 registers with the outer end 34 of the primary rotor 24 since it is displaced one-half of a revolution from the reference station on its path under the particular set of conditions hereinbefore discussed. Consequently, the primary rotor 24 conveys light from the light source 26 to the photocell 28, whereupon the photoelectric relay 30 is activated to momentarily open the normally closed switch 100 and to momentarily close the normally open switch 102. Such opening of the switch 100 de-energizes the driving electromagnets 76 and the holding relay 98, while such momentary closure of the switch 102 energizes the braking electromagnets 88 and the holding relay 104 therefor, thereby uncoupling the integrating means 50 from the actuating means 52 and braking it to a substantially instantaneous stop to avoid coasting thereof, which is an important feature of the invention. The integrating means 50 remains uncoupled from the actuating means 52 until the secondary rotor 36 completes one revolution and the cam thereon again engages the switch means 48 in the manner hereinbefore discussed to produce a repetition of the foregoing events in the operating cycle of the integrating apparatus.

As will thus be apparent, with the pointer 18 displaced one-half of a revolution from the zero point on the dial 20, the integrating means 50 is energized throughout one-half of a revolution of the secondary rotor 36. Similarly, when the pointer 18 is displaced one-third of a revolution from the zero point on the dial 20, the integrating means 50 is energized throughout only one-third of a revolution of the secondary rotor 36, and when the pointer 18 is displaced two-thirds of a revolution from the zero point on the dial 20, the integrating means 50 is energized throughout two-thirds of a revolution of the secondary rotor 36, and so forth. Thus, for each revolution of the secondary rotor 36, the integrating means 50 is advanced an increment corresponding to the weight of material on the conveyor 12. If desired, the integrating means may be calibrated in any suitable units, such as tons. As hereinbefore indicated, the integrating means 50 may include an ordinary counter, which may be caused to read directly in tons, or other suitable units, by selecting a suitable speed for the counter, depending upon the particular counter utilized.

It will be noted that the integrating apparatus of the invention, in addition to taking variations in the weight of material on the conveyor 12 into consideration by energizing the integrating means 50 for the portion of each revolution of the secondary rotor 36 corresponding to the displacement of the primary rotor 24 from its reference station, also takes variations in the conveyor speed into consideration because of the fact that the integrating means is driven at a speed proportional to the conveyor speed when it is energized. For example, if the conveyor 12 were to stop with a load thereon, the clutch means 54 would periodically couple the integrating means 50 to and uncouple it from the actuating means 52, but the integrating means 50 would not be advanced under such conditions. On the other hand, if the conveyor 12 is operating with no load thereon, the actuating means 52 would be operating, but the clutch means 54 would not be operated to couple the integrating means 50 to the actuating means 52 since the light source 26 on the secondary rotor 36 would activate the photoelectric relay 30 at the same instant that the cam 46 operates the switch means 48.

It will be apparent that the accuracy of the integration provided by the integrating apparatus of the invention depends on the speed of the secondary rotor 36 since the apparatus operates essentially on a periodic scanning principle. With an installation wherein the load on the conveyor 12 varies but little, the integrating apparatus of the invention may be designed to utilize a relatively low speed for the secondary rotor 36. However, if weight variations on the conveyor are likely to be large, and frequent, then a design utilizing a higher secondary rotor speed should be employed, all as will be apparent to those skilled in the art.

Although I have disclosed an exemplary embodiment of the invention herein for purposes of illustration, it will be understood that various changes, modifications and substitutions may be incorporated in such embodiment without departing from the spirit of the invention as defined by the claims hereinafter appearing.

I claim as my invention:

1. In an apparatus for integrating a variable, the combination of: a primary, light-conveying rotor movable along a circular path relative to a reference station thereon; means for rotating said primary rotor along said path distances proportional to variations in said variable so that the distance of said primary rotor from said reference station is always proportional to the magnitude of said variable; a secondary rotor rotatable about the axis of rotation of said primary rotor; means for rotating said secondary rotor; integrating means; energizing means including an element on said secondary rotor for energizing said integrating means when said secondary rotor is in a first position; and de-energizing means for de-energizing said integrating means when said secondary rotor is in a second position spaced from said first position thereof a distance proportional to the distance of said primary rotor from said reference station, said de-energizing means including a light source on said secondary rotor and movable along said path and adapted to register with said primary rotor, and including photoelectric switching means receiving light from said light source through said primary rotor when said light source registers with said primary rotor.

2. In an apparatus for integrating a variable, the combination of: a rotor; integrating means; energizing means for energizing said integrating means when said rotor is in a first position; photoelectric means connected to said integrating means for de-energizing said integrating means; a light source on said rotor; means responsive to the position of said rotor for conveying light from said light source to said photoelectric means to de-energize said integrating means; and means for positioning said rotor in a second position a distance from said first position thereof which is a function of the magnitude of said variable.

3. In an apparatus for integrating a variable, the combination of: a rotor; integrating means; energizing means including an element on said rotor for energizing said integrating means when said rotor is in a first position; photoelectric means for de-energizing said integrating means; a light source on said rotor; movable light-conveying means registering with said photoelectric means and positioned on the path of said light source so as to convey light from said light source to said photoelectric means once per revolution of said rotor; and means for moving said light-conveying means along said path of said light source, relative to a reference station corresponding to said first position of said rotor, distances which are a function of variations in said variable so that the distance of said light-conveying means from said reference station is always a function of the magnitude of said variable, whereby said photoelectric means receives light from said light source through said light-conveying means to de-energize said integrating means when said rotor is in a second position spaced from said first position thereof a distance which is a function of the distance of said light-conveying means from said reference station, and which is thus a function of the magnitude of said variable.

4. In an apparatus of the character described, the combination of: a rotor; integrating means; means including an element on said rotor for energizing said integrating means; photoelectric means for de-energizing said integrating means; a light source on said rotor; and light-conveying means rotatable about the axis of rotation of said rotor for conveying light from said light source to said photoelectric means to de-energize said integrating means.

5. In combination: movable light-conveying means; a light source on the path of said light-conveying means; means for moving said light-conveying means along its path; means carrying said light source for moving same along said path; a pair of electric circuits; means for energizing one of said circuits when said light-source-carrying means is in one position; and photoelectric means operable by light conveyed thereto by said light-conveying means for energizing the other of said circuits when said light-source-carrying means is in another position such that said light source registers with said light-conveying means.

6. In combination: movable light-conveying means; a light source on the path of said light-conveying means; means for moving said light-conveying means along said path; means carrying said light source for moving same along said path; integrating means; means for energizing said integrating means when said light-source-carrying means is in one position; and photoelectric means operable by light conveyed thereto by said light-conveying means for de-energizing said integrating means when said light-source-carrying means is in another position such that said light source registers with said light-conveying means.

7. In an apparatus for weighing the material transported by a conveyor, the combination of: movable light-conveying means; means responsive to the weight of the material on said conveyor for moving said light-conveying means along its path relative to a reference station thereon; a light source on said path; means carrying said light source for moving same along said path; integrating means; means for energizing said integrating means when said light-source-carrying means is in one position corresponding to said reference station; and photoelectric means for de-energizing said integrating means, said photoelectric means registering with said light-conveying means and receiving light from said light source through said light-conveying means to de-energize said integrating means when said light-source-carrying means is in another position such that said light source registers with said light-conveying means.

8. In an apparatus for integrating a variable, the combination of: light-conveying means movable along a predetermined path having a reference station thereon; means connected to said light-conveying means for maintaining same a distance from said reference station which is a function of the magnitude of said variable; a light source on said path and adapted to register with said light-conveying means; means carrying said light source for moving same along said path; integrating means; means for energizing said integrating means when said light-source-carrying means is in a position such that said light source is at said reference station; and means for de-energizing said integrating means when said light-source-carrying means is in a position such that said light source registers with said light-conveying means, including photoelectric means registering with said light-conveying means and adapted to receive light conveyed thereto by said light-conveying means from said light source.

9. An apparatus as defined in claim 8 including actuating means for said integrating means and including clutch means for coupling said integrating means to and uncoupling said integrating means from said actuating means.

10. An apparatus as defined in claim 9 wherein said means for energizing said integrating means includes means for engaging said clutch means to cause said clutch means to couple said integrating means to said actuating means, and wherein said means for deenergizing said integrating means includes means for disengaging said clutch means to cause said clutch means to uncouple said integrating means from said actuating means.

11. An apparatus as defined in claim 10 including means for braking said integrating means in response to disengagement of said clutch means to uncouple said integrating means from said actuating means.

12. In an apparatus for integrating a variable, the combination of: a member movable along a predetermined path relative to a reference station thereon; means for maintaining said member at a distance from said reference station which is a function of the magnitude of said variable; integrating means; and means for periodically energizing said integrating means for a period of time which is a function of said distance, including photoelectric means, having scanning means movable along said path to locate said member, for de-energizing said integrating means.

13. In an apparatus for integrating a variable, the combination of: a primary, light-conveying rotor movable along a circular path relative to a reference station thereon; means for rotating said primary rotor along said path distances proportional to variations in said variable so that the distance of said primary rotor from said reference station is always proportional to the magnitude of said variable; a secondary rotor rotatable about the axis of rotation of said primary rotor; means for rotating said secondary rotor; integrating means; energizing means for energizing said integrating means when said secondary rotor is in a first position; and de-energizing means for de-energizing said integrating means when said secondary rotor is in a second position spaced from said first position thereof a distance proportional to the distance of said primary rotor from said reference station, said deenergizing means including a light source on said secondary rotor and movable along said path and adapted to register with said primary rotor, and including photoelectric switching means receiving light from said light source through said primary rotor when said light source registers with said primary rotor.

14. In an apparatus for integrating a variable, the combination of: a rotor; integrating means; energizing means for energizing said integrating means when said rotor is in a first position; photoelectric means for deenergizing said integrating means; a light source on said rotor; movable light-conveying means registering with said photoelectric means and positioned on the path of said light source so as to convey light from said light source to said photoelectric means once per revolution of said rotor; and means for moving said light-conveying means along said path of said light source, relative to a reference station corresponding to said first position of said rotor, distances which are a function of variations in said variable so that the distance of said light-conveying means from said reference station is always a function of the magnitude of said variable, whereby said photoelectric means receives light from said light source through said light-conveying means to de-energize said integrating means when said rotor is in a second position spaced from said first position thereof a distance which is a function of the distance of said light-conveying means from said reference station, and which is thus a function of the magnitude of said variable.

15. In an apparatus for integrating a variable, the combination of: a light-conveying rotor movable along a circular path from a reference point thereon; means for moving said light-conveying rotor along said path as a function of any variation in said variable so that the distance of said light-conveying rotor from said reference point is always a function of the magnitude of said variable; a scanning rotor rotatable about the axis of rotation of said light-conveying rotor; means for continuously rotating said scanning rotor; an integrator; means for energizing said integrator when said scanning rotor is in a first position corresponding to said reference point on said path; and de-energizing means for de-energizing said integrator when said scanning rotor is in a second position corresponding to the position of said light-conveying rotor on said path, whereby said de-energizing means de-energizes said integrator when said scanning rotor is in a second position spaced from said first position thereof a distance which is a function of the distance of said light-conveying rotor from said reference point, said de-energizing means including a light source on said scanning rotor and movable along said path and adapted to register with said light-conveying rotor, and including light-sensitive means receiving light from said light source by way of said light-conveying rotor when said light source registers with said light-conveying rotor.

16. An apparatus as defined in claim 15 including an actuator for said integrator and including a clutch for coupling said integrator to and uncoupling said integrator from said actuator, said clutch including a driving member connected to said actuator, a driven member connected to said integrator, a braking member spaced from said driving member, magnetic means on said driving member, magnetic means on said braking member, and a clutch member connected to said driven member and disposed between said magnetic means on said braking member and said magnetic means on said driving member, said energizing means including means for energizing said magnetic means on said driving member to cause said clutch member to engage said driving member and thus connect said driving member to said integrator, and said de-energizing means including means for energizing said magnetic means on said braking member to cause said clutch member to engage said braking member and thus de-energize said integrator.

17. In an apparatus for integrating a variable, the combination of: a primary member movable along a predetermined path relative to a reference point thereon; means for moving said primary member along said path as a function of any variation in said variable so that the distance of said primary member from said reference point is always a function of the magnitude of said variable; a secondary member movable along said path; means for continuously moving said secondary member along said path; an integrator; energizing means for energizing said integrator when said secondary member is in a first position on said path; and de-energizing means for de-energizing said integrator when said secondary member is in a second position on said path spaced from said first position thereon a distance which is a function of the distance of said primary member from said reference point, said de-energizing means including light-sensitive scanning means for locating the position of said primary member on said path, said light-sensitive scanning means including a light-sensitive element and including cooperating means on said primary and secondary members for delivering light of a predetermined intensity to said light-sensitive element when said secondary member is in said second position thereof.

18. In an apparatus for integrating a variable, the combination of: a primary member movable along a predetermined path relative to a reference point thereon; means for moving said primary member along said path as a function of any variation in said variable so that the distance of said primary member from said reference point is always a function of the magnitude of said variable; an integrator; means for energizing said integrator periodically; and means, including light-sensitive scanning means for locating the position of said primary member on said path, for de-energizing said integrator after each energization thereof upon the lapse of an interval of time which is a function of the distance of said primary member from said reference point, said light-sensitive scanning means including a light-sensitive element and including means for delivering light of a predetermined intensity to said light-sensitive element upon the lapse of said interval of time.

References Cited in the file of this patent

UNITED STATES PATENTS

| | | |
|---|---|---|
| 1,155,124 | Berger | Sept. 28, 1915 |
| 2,098,266 | Walker | Nov. 9, 1937 |
| 2,261,655 | Lowe | Nov. 4, 1941 |
| 2,314,019 | Shaw | Mar. 16, 1943 |
| 2,689,684 | Laternser | Sept. 21, 1954 |

FOREIGN PATENTS

| | | |
|---|---|---|
| 586,614 | Germany | Oct. 24, 1933 |
| 679,899 | Germany | Aug. 18, 1939 |